United States Patent [19]

May

[11] Patent Number: 4,595,905

[45] Date of Patent: Jun. 17, 1986

[54] AUTOMATIC SMOKER'S ALARM APPARATUS

[76] Inventor: Kenneth C. May, Box 211 A, Battletown, Ky. 40104

[21] Appl. No.: 578,935

[22] Filed: Feb. 10, 1984

[51] Int. Cl.[4] .............................................. H04Q 3/00

[52] U.S. Cl. .............................. 340/309.15; 131/238; 131/231; 340/527; 340/309.5

[58] Field of Search ................ 340/309.15, 309.5, 321, 340/288, 527, 568; 131/174, 231, 238, 330, 256, 335; 200/61.81, 61.58 R, 61.19

[56] References Cited

U.S. PATENT DOCUMENTS

| | | | |
|---|---|---|---|
| D. 171,653 | 3/1954 | Kuhlman | 131/238 |
| 2,117,066 | 5/1938 | Liverance | 200/61.19 |
| 4,520,345 | 5/1985 | Smit | 340/309.15 |

*Primary Examiner*—John W. Caldwell, Sr.
*Assistant Examiner*—Ted Rittmaster
*Attorney, Agent, or Firm*—Richard L. Caslin

[57] ABSTRACT

This automatic apparatus is for use by cigarette smokers who may be in danger of going to sleep with a lighted cigarette near at hand, to possibly cause fire and both personal and property damage. This apparatus is for use with an ashtray, and there is a socket in the top wall for receiving a cigarette lighter for storage therein. The apparatus includes an electric switch associated with the socket for detecting the presence of the lighter therein. In series with this switch is an ON delay timer that is in series with an audible alarm device. Also associated with the switch is a spring-biased plunger with a feeler pin that is capable of engaging the lighter. When the lighter is removed so that the user may light his cigarette, the plunger is allowed to move to close the switch thereby energizing the ON delay timer for a given timed cycle. A cigarette crusher is mounted adjacent the front of the apparatus. A linkage mechanism joins the cigarette crusher to the spring-biased plunger, for deactivating the alarm cycle when the cigarette is extinguished. If the cigarette is not extinguished, the alarm will sound.

7 Claims, 4 Drawing Figures

AUTOMATIC SMOKER'S ALARM APPARATUS

BACKGROUND OF THE INVENTION

1. Field of the Invention

This invention relates to ashtrays having a timer-controlled alarm system that serves to awaken the smoker in the event the smoker fails to extinguish the cigarette or smoking material in the ashtray, thereby deactivating the timer and its alarm system.

2. Description of the Prior Art

The Rossitto U.S. Pat. No. 3,360,790 describes a timer-controlled alarm for an ashtray. The timer is set manually by the smoker, but this is not an automatic setting. The smoker must remember to set the timer when he lights up his smoking material. There is no connection between the ashtray and the timer, as in the present invention. Once the timer is set in the Rossitto patent, the alarm will sound when the timer returns to a zero setting.

The Dahl U.S. Pat. No. 3,205,900 describes an ashtray with an electrically operated alarm for audibly indicating when a cigarette should be snuffed out. There is an ash-receiving bowl, an alarm device mounted under the bowl, and a battery-operated motor connected through suitable gearing to the alarm device. The alarm device is arranged to generate an audible signal in response to energization of the motor, and it may comprise a mechanically driven music box. There are several ash-receiving troughs which communicate with the bowl, and on which a lighted cigarette may be placed. There is a bimetallic element associated with each trough. Thus, when the cigarette burns down, it heats up the bimetallic element which, in turn, energizes the motor circuit and sets off the alarm. This alarm system is related to the burning of a cigarette within the trough of the ashtray 10. This Dahl patent would not prevent a smoker from causing a fire by falling asleep with a cigarette in his mouth.

The Starkenberg U.S. Pat. No. 2,681,656 describes an animated ashtray having a rimmed bowl on which cigarettes may be mounted. The danger is that as the cigarette continues to burn in the ashtray, its center of gravity changes, and it may topple off the ashtray, outside the bowl, and damage the table on which the ashtray is supported. This patent relates to a water system for extinguishing the cigarette. A water-filled bulb is supported on a pivoted operating lever, and an elephant with its trunk directed at the cigarette is furnished with the water from the bulb. A key element of this patent is a bimetallic member which becomes heated by the cigarette and will pivot a lever mechanism so that an actuator will compress the bulb and force the water to pass through the trunk of the elephant and be directed at the cigarette to extinguish it. This patent assumes that the cigarette will be parked on the edge of the ashtray, which, of course, is quite different from the present invention.

The Nelson U.S. Pat. No. 2,604,557 is from an unrelated art that is not concerned with smoking material or ashtrays. This patent describes an article-operated switch for use near a telephone, and it includes a pencil or pen so that the withdrawal of the pencil or pen from the device will cause a lamp to be energized and to remain energized until the pencil or pen is returned to its storage position.

The Compton U.S. Pat. No. 3,803,579 describes an automatic alarm system for a bathroom toilet for use by handicapped persons. A conventional flush-type commode is provided with a mercury switch mounted on the manually operated actuating arm of the flush mechanism. An electrically operated timer is mounted near the commode, and it is reset every time the commode is flushed. Failure to flush the commode periodically, due to incapacitation of the occupant, permits the timer to run its cycle, at the end of which the alarm is actuated, and neighbors or friends will be informed that they should visit the occupant to check his whereabouts and safety.

The Nishina U.S. Pat. No. 3,909,820 is another patent from an unrelated art which describes a repeating alarm device, having a particular motor and gear mechanism for operating the alarm. This patent is not directed toward safety around an ashtray and the burning of smoking material.

The last patent is to Herrick U.S. Pat. No. 4,012,732 which is also not related to ashtrays or safety around burning material, such as cigarettes and the like. This patent relates to a security device for use by elderly people or the handicapped who live alone. An inanimate object, such as a house key, is placed in a key dish when the person is at home. There is also an activity detector present. The placement of the key in the dish sets a clock timer to measure a period of time. In the event there is human activity in the house, the clock timer will be reset to zero. If the key is in the dish and there is no human activity over a long period of time, then the alarm goes off. When the person leaves the residence, the key is removed from the dish and no clock timer is actuated. However, if a burglar were to enter the residence, the human activity detector would sense this and set off the alarm.

OBJECTS OF THE PRESENT INVENTION

The principal object of the present invention is to provide an automatic smoker's alarm apparatus which is activated when a cigarette lighter is removed from the apparatus and which is deactivated when a lighted cigarette is crushed on the cigarette crusher so that the smoker must be awake to deactivate the alarm system, otherwise the alarm will sound automatically.

A further object of the present invention is to provide an alarm apparatus of the class described where the alarm is set to sound within a time frame that is shorter than the time it takes to smoke a standard cigarette completely.

A further object of the present invention is to provide an automatic smoker's alarm apparatus of the class described in combination with a cigarette lighter and an ashtray where the alarm cycle is energized with the removal of the cigarette lighter from the apparatus, and where the return of the lighter to the apparatus does not deactivate the alarm system.

A further object of the present invention is to provide an alarm apparatus of the class described with a cigarette crusher that must be employed to extinguish the cigarette in order to prevent the alarm from sounding.

A further object of the present invention is to provide an alarm apparatus of the class described where the housing is provided with stabilizing standards to prevent the apparatus from tipping over when the cigarette is crushed out.

SUMMARY OF THE INVENTION

The present invention provides an automatic smoker's alarm apparatus for use with an ashtray, where the apparatus has a hollow housing to one side of an ashtray, and the housing includes a socket for receiving a cigarette lighter for storage therein. A spring-biased plunger is provided for detecting the presence of the lighter within the socket. Associated with this plunger is an electrical switch mechanism that is normally open, and the switch is closed when the lighter is removed from the socket. The plunger includes a feeler pin that is capable of extending into the socket for engaging the lighter. When the lighter is removed from the socket for lighting a fresh cigarette, the plunger is moved automatically to close the switch contacts and the feeler pin serves as a temporary obstruction to the return of the lighter to the bottom of the socket. The housing includes an audible alarm furnished in series with an ON delay timer that is controlled by the electrical switch contacts from a power source so that the alarm device will sound after a fixed time. A cigarette crusher is mounted at the front of the housing and it includes linkage mechanism connected back to the plunger so that when a cigarette is extinguished on the crusher, the linkage mechanism will compress the plunger to open the switch contacts and deactivate and reset ON delay timer to a starting position, while also allowing the cigarette lighter to return to the bottom of the socket and make preparation for the start of the next cycle.

DESCRIPTION OF THE PREFERRED EMBODIMENTS

Figure 1:
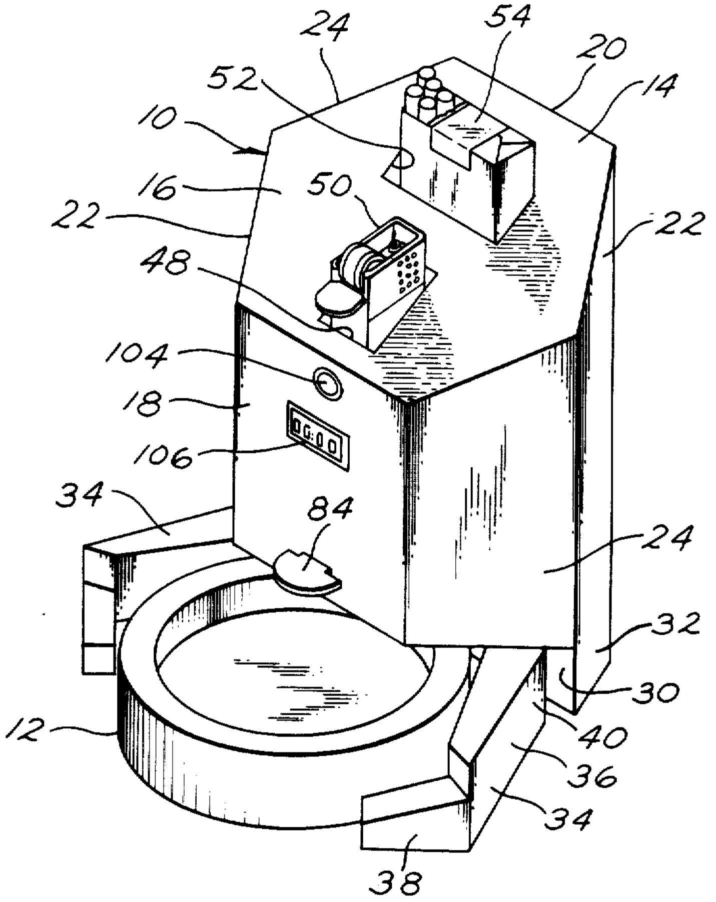
FIG. 1 is front perspective view of an automatic smoker's alarm apparatus of the present invention associated with an ashtray.

Turning now to a consideration of drawings, and in particular, to the front perspective view of FIG. 1, there is shown an automatic smoker's alarm apparatus 10 for use with a separate ashtray 12. It has been found handy to have the ashtray separate from the alarm apparatus 10 so the ashtray can be easily dumped of its ashes and washed in the sink. It is conceivable that some manufacturers would unite the ashtray to the alarm apparatus, and this is within the scope of this invention. This alarm apparatus 10 has a hollow housing 14 of molded plastic that has a top wall 16 formed of a hexagonal configuration with a front wall 18, rear wall 20, and two pairs of parallel side walls 22 and 24. Of course, the precise shape of the housing 14 is not critical to the present invention in that other configurations of the housing would be acceptable without departing from the scope of the present invention.

Figure 3:
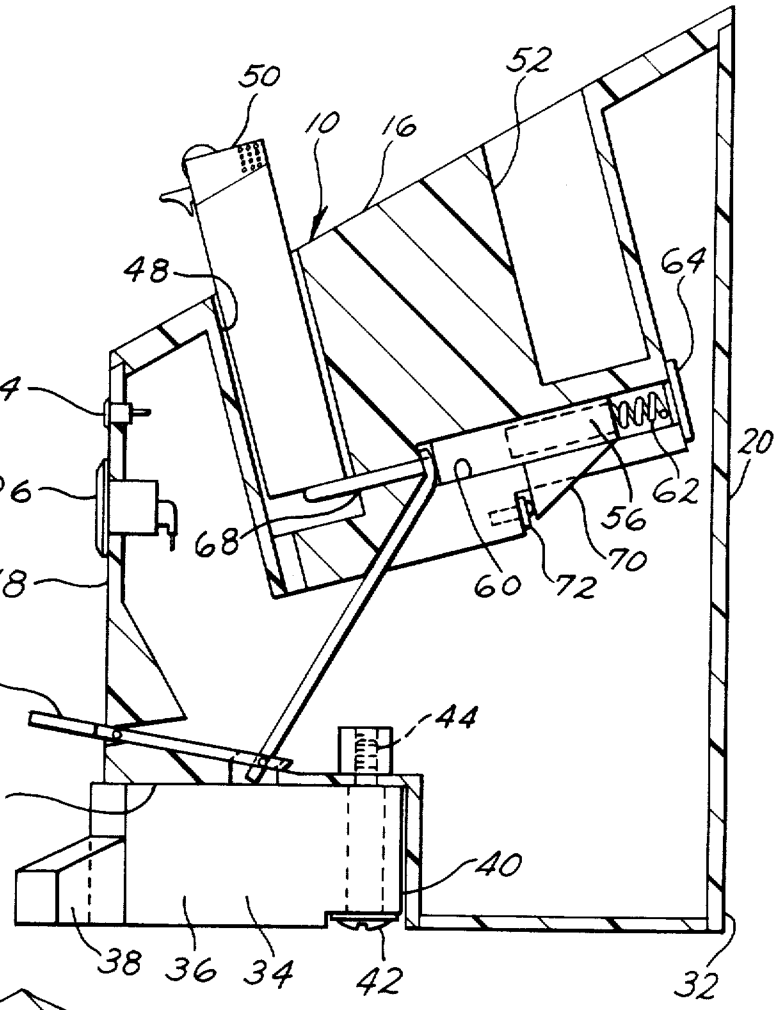
FIG. 3 is a left side cross-sectional elevational view taken through the center of the alarm apparatus from front to back with the ashtray removed from the apparatus and showing one of the pivoted standards retracted into the recess in the front of the hollow housing.

As is seen in the left side cross-sectional elevational view of FIG. 3, the top wall 16 of the housing is inclined upwardly from the top edge of the front wall 18 to the top edge of the rear wall 20. Notice in this FIG. 3 that there is a recess 30 formed in the front section of the base portion 32 of the housing 14. This recess is for receiving a small portion of the separate ashtray 12 therein so that the front wall 18 of the housing 14 overlies the ashtray. The ashtray 12 is not shown in this FIG. 3. What is shown is one of a pair of pivoted standards 34 that serve as a retractable stabilizing means for the housing 14 of the alarm apparatus to insure that this apparatus does not tip over during normal use. FIG. 1 probably shows these two pivoted standards 34 to get a better understanding of their nature. Each standard 34 when viewed in top plan view has a larger straight portion 36, and a smaller angular portion 38. Each standard is pivoted at its innermost end 40 by means of a vertical hinge screw 42 that is assembled from the bottom of the housing 14 and threaded into a threaded hole 44. Thus these two pivoted standards 34 are retractable into the recess 30 when the apparatus is to be loaded into a box or carton for sales display. In this retracted position the two angular portions 38 will generally conform to the front wall 18 of the housing. when this alarm apparatus is to be set up the two pivoted standards 34 would be opened outwardly for receiving the separate ashtray 12 therebetween and the standards would be pressed against the sides of the ashtray for improved stability.

An important feature of this invention is that the top portion of the housing 14 has a deep socket 48 for receiving a cigarette lighter 50 therein for storage purposes. Of course cigarette lighters come in all sizes and shapes. Probably the most widely used type of cigarette lighter today is a disposable cigarette lighter and that is the type that is illustrated as element 50, although the socket 48 could be redesigned to accommodate almost any type of cigarette lighter. As an added convenience, a second deep socket 52 is formed in the top of the housing 14 to accommodate a pack of cigarettes 54, as seen in FIG. 1, but this is not critical to the practice of the present invention.

Figure 4:
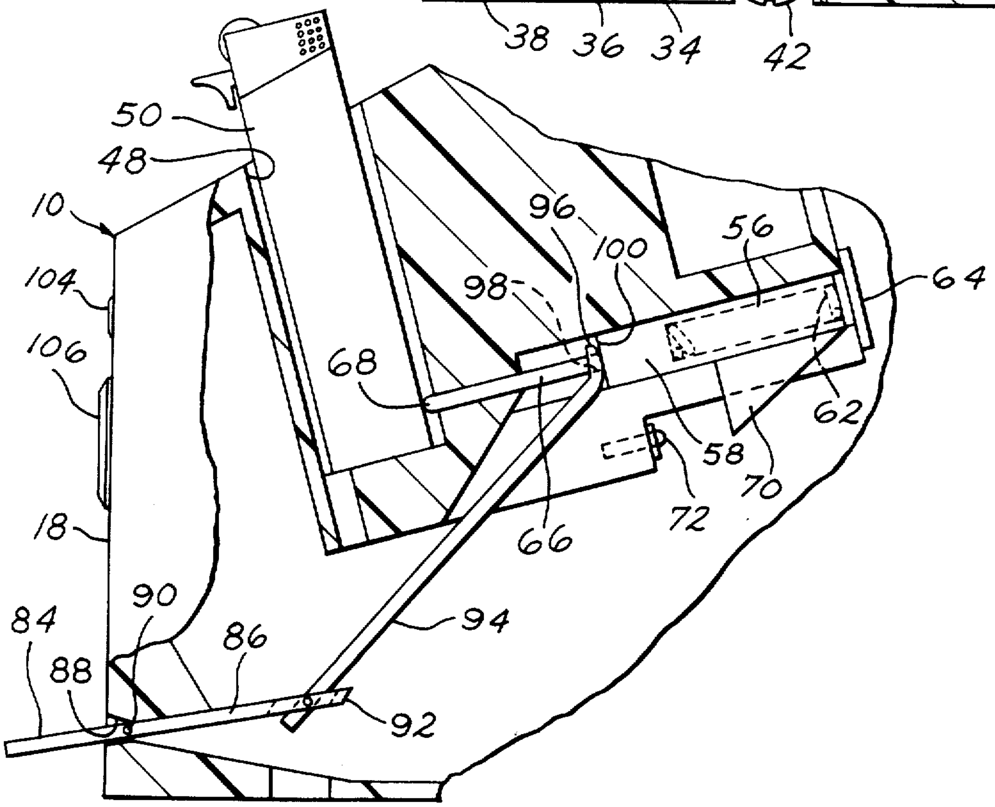
FIG. 4 is a fragmentary cross-sectional elevational view similar to that of FIG. 3, and showing the cigarette lighter stored in a socket formed in the top wall of the apparatus.

Associated with the socket 48 for the cigarette lighter 50 is an electrical switch mechanism 56, as is best seen in FIG. 4, for detecting the presence of the lighter 50 within the socket. This switch mechanism 56 includes a spring-biased plunger 58 that is installed within an elongated chamber and capable of reciprocating motion therein. Notice the plunger 58 is partially hollow at the right end for receiving the compression spring 62 therein. The right end of this chamber 60 is sealed with a removable cap 64. The left end of the plunger 58 is fitted with an elongated feeler pin 66 that extends longitudinally of the plunger and through a hole 68 in the side wall of the socket 48 so as to be able to contact the size of the lighter 50, as seen in FIG. 4. When the user removes the lighter 50 from the socket 48, the compression spring 62 will shift the plunger 58 to the position shown in FIG. 3. In this position the feeler pin 66 obstructs the lighter 50 from returning to the bottom of the socket 48. In other words, the lighter 50 does not seat on the bottom of the socket but instead is suspended partially out of the socket in a raised position.

The plunger 58 is of brass material and it includes a side arm 70 that serves as a movable contact of the electrical switch mechanism 56 for closing a circuit with a fixed contact 72 that is attached to the housing in the path of movement of the side arm 70 of the plunger 58 for closing this switch mechanism whenever the lighter 50 is removed from the socket 48, thereby allowing the feeler pin 66 to enter the socket as is best seen in FIG. 3.

Figure 2:
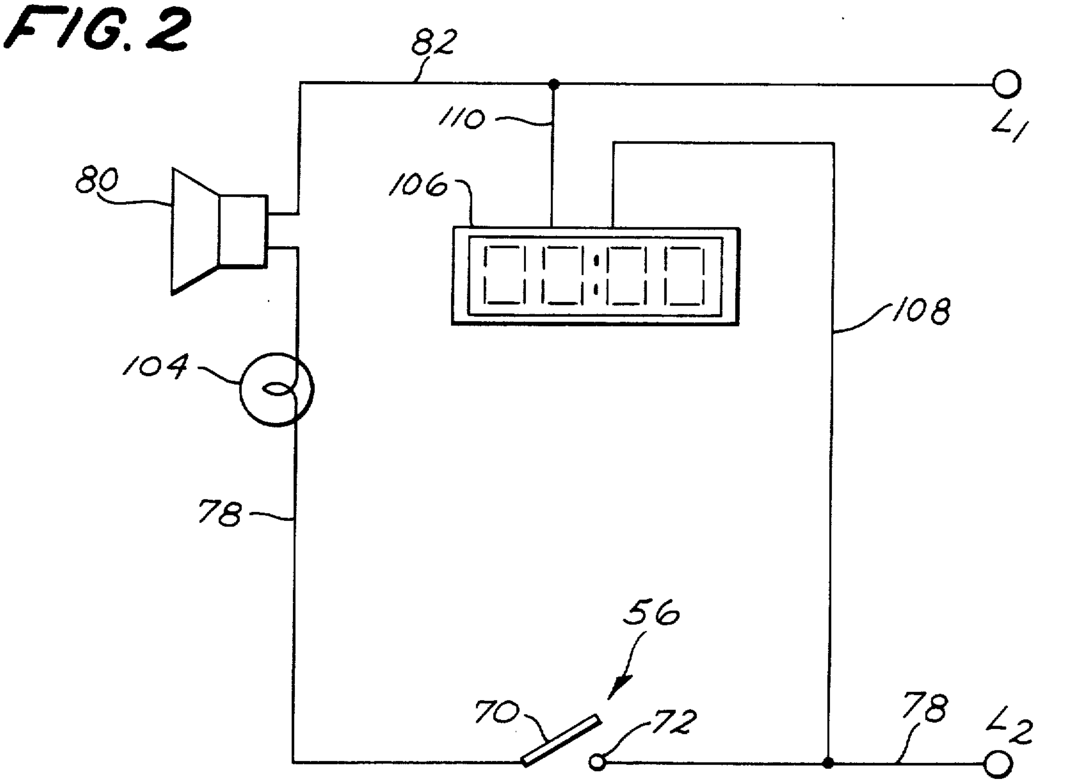
FIG. 2 is a schematic electrical diagram of the alarm circuit.

Turning now to a consideration of the schematic wiring diagram of FIG. 2, the power source is denoted by the two line terminals $L_1$ and $L_2$. The preferred embodiment of this invention uses a 9-volt dry cell battery, but it will be understood by those skilled in this art that this apparatus could be furnished with a transformer (not shown) so that a power cord could be plugged into the standard convenience outlet that is furnished with 120 volt ac as is standard in residential wiring. The electrical switch 56 is shown in the lead wire 78 from line $L_2$, where the switch has a movable contact 70 and a fixed contact 72. This switch is a normally open switch when this alarm apparatus is in its non-use mode, as is shown in FIG. 4. In series with the electric switch 56 is a combined ON delay timer/alarm 80 which is connected by lead wire 82 back to the other line $L_1$. Of course this combined ON delay timer/alarm 80 could be replaced by separate elements; namely, a separate timer and a separate alarm. It makes no difference to the practice of the present invention. This ON delay timer 80 may have a variable timed cycle. One acceptable cycle would be for about seven minutes which is a time shorter than the time for smoking the entire length of a standard cigarette. Other manufacturers might have a preference for a different time.

Thus, when the user removes the lighter 50 from the socket 48 and lights his cigarette, the electrical switch mechanism 56 will close and complete the circuit from the power source to the combined ON delay timer/alarm so that a time cycle will begin to run for about seven minutes. At the end of this time cycle the alarm will sound until something is done to open the switch mechanism 56.

The present invention has been conceived with the primary objective that the smoker should consciously extinguish his cigarette before it burns down to nothing. If the smoker happens to fall asleep or his attention is diverted away from the cigarette, this alarm apparatus is designed to sound and awaken the smoker to his responsibility of preventing fire and damage. Thus the alarm has been designed to be annoying when it sounds so that the smoker will be motivated to extinguish his cigarette before the alarm is allowed to sound. This motivation to encourage the smoker to extinguish his cigarette is provided within this apparatus by first including at the front of the housing 14 a cigarette crusher 84 which is actually the front end of a pivoted lever 86 that extends through a small opening 88 in the lower portion of the front wall 18. A small pivot pin 90 is mounted in the housing and extends through the sides of the lever 86 to render this lever a see-saw action in the manner of a trigger for reversing the action of the spring-biased plunger 58 of the electrical switch mechanism 56. Pivoted to the innermost end 92 of the pivoted lever 86 is an elongated pushrod 94 which is fitted at its innermost end 96 with a hole 98 for receiving the feeler pin 66 therethrough. This end 96 of the pushrod 94 is designed to be always in engagement with the end wall 100 of the plunger 58. Thus when the smoker wants to extinguish his cigarette, he will press the lighted end of the cigarette down on the crusher 84 until the ashes and fire separate from the cigarette. In so doing, a positive force is exerted down on the cigarette crusher 84 and this causes the pivoted lever 86 to turn slightly counterclockwise, thereby causing the pushrod to extend itself against the plunger 58 in FIG. 3 against the action of the compression spring 62 so that the plunger travels to the right from the position it is in FIG. 3 to the position it is in in FIG. 4; this serves to open the electric switch mechanism 56 because the movable contact 70 moves away from the fixed contact 72 and this deenergizes the combined ON delay timer/alarm 80 and resets this alarm apparatus into its at rest mode as depicted in FIG. 4. Thus the alarm will not sound and the apparatus has accomplished its objective; namely, to insure that the smoker will extinguish his cigarette before it becomes a safety hazard from a fire standpoint.

Another feature added to this invention is an indicator light 104 which is in series with both the timer/alarm 80 so that this light is energized whenever the timed alarm cycle is in operation. As shown in FIG. 3, this indicator light 104 is mounted in the front wall 18 of the housing 14 to be over the ashtray 12.

Another convenient feature added to this invention is a digital clock 106 which is connected directly across the two line terminals $L_1$ and $L_2$ by the lead wires 108 and 110. This clock 106 is strategically located on the front wall of the housing beneath the indicator light 104 for intermittent illumination. Of course the clock could have its own built-in illumination system, but added illumination could be obtained by the user removing the lighter 50 from the socket 48 thereby initiating the timed alarm cycle, and after the time is observed, the user could depress the cigarette crusher to deactivate the alarm cycle so that the alarm wouldn't sound.

Modifications of this invention will occur to those skilled in this art. Therefore, it is to be understood that this invention is not limited to the particular embodiments disclosed, but that it is intended to cover all modifications which are within the true spirit and scope of this invention as claimed.

What is claimed is:

1. An automatic smoker's alarm apparatus for use with an ashtray comprising:

a. a hollow housing having a front wall that is adapted to overlie a portion of an ashtray, and a top wall that is furnished with an elongated socket that is adapted to receive a cigarette lighter for storage therein;

b. an electrical switch mechanism associated with the socket for detecting the presence of the lighter within the socket, said switch mechanism having fixed and movable electrical contact means, a spring-biased plunger controlling the movable contact means, where the plunger includes a feeler pin that is capable of extending into the interior of the socket for engaging the lighter;

c. whereby when the lighter is removed from the socket, the plunger is moved automatically by the spring-biasing means to close the switch contact means, the feeler pin in this position of the plunger serving as a temporary obstruction that prevents the bottom of the lighter from descending to the bottom of the socket;

d. the housing including an audible alarm device furnished with an ON delay timer that is controlled by the electrical switch mechanism from a power source so that the alarm device will sound after a fixed time that is generally shorter than the time for smoking an average cigarette;

e. a cigarette crusher mounted adjacent the front wall of the housing, and linkage means joining the crusher to the spring-biased plunger whereby when a cigarette is extinguished on the crusher, the linkage means will compress the plunger against its spring-biasing means to open the switch contact means and deactivate and reset the said ON delay timer to a starting position, said compressed plunger also withdrawing the feeler pin from the socket to allow the lighter to descend to the bottom of the socket thereby holding the plunger against its spring-biasing means and maintaining the switch contacts open for completing the cycle of operation of the apparatus and holding it in readiness for its next use.

2. The invention as recited in claim 1 wherein the said cigarette crusher is formed as part of the said linkage means, where the crusher is integral with the outer end of a pivoted lever that is mounted through an opening in the front wall of the housing, the innermost end of the said lever having pivoted thereon a push rod that bears at its other end against the said spring-biased plunger.

3. The invention as recited in claim 2 wherein the said housing of this smoker's alarm has a base portion the front section of which is recessed and adapted to receive one side of an ashtray therein for catching the fire and ashes that fall from the said cigarette crusher when a cigarette is extinguished thereon.

4. The invention as recited in claim 3 wherein the said recessed front section of the base of the housing includes retractable stabilizing means which may be spread out to encompass an ashtray and prevent the apparatus from tipping over.

5. The invention as recited in claim 4 wherein the said retractable stabilizing means comprises a pair of pivoted standards that in one storage position may retract into the said recess of the base, and in one operating position may be positioned adjacent the opposite sides of an ashtray combined with this alarm.

6. The invention as recited in claim 2 wherein the alarm apparatus has an electrical circuit that in addition to the said power source and the switch contacts means for the said audible alarm and ON delay timer, includes an indicator light mounted on the exterior of the housing to signal only when the ON delay timer is energized, and a clock mechanism.

7. The invention as is recited in claim 1 wherein the said cigarette crusher is in the form of a pivoted lever that extends through an opening in the front wall of the housing and is furnished with a see-saw action, the said linkage means comprising an elongated pushrod that is pivotally joined at one end to the innermost end of the pivoted lever of the crusher and is loosely joined to the said spring-biased plunger so that a downward force exerted on the said crusher shall move the plunger against the action of the said spring-biasing means.

* * * * *